United States Patent [19]

Yajima

[11] Patent Number: 4,749,116
[45] Date of Patent: Jun. 7, 1988

[54] APPARATUS FOR FORMING A PIPE FRAME
[75] Inventor: Yutaka Yajima, Akishima, Japan
[73] Assignee: Tachikawa Spring Co., Ltd., Tokyo, Japan
[21] Appl. No.: 940,081
[22] Filed: Feb. 2, 1987

Related U.S. Application Data

[63] Continuation-in-part of Ser. No. 616,893, Jun. 4, 1984, abandoned.

[51] Int. Cl.[4] .............................................. B23K 9/12
[52] U.S. Cl. ...................................... 228/6.1; 228/17; 228/173.4; 29/33 K; 29/33 T; 29/563
[58] Field of Search .................... 228/17, 6.1, 173.4, 228/173.5; 29/33 K, 33 T, 33 F, 34 R, 34 D, 563, 564, 564.1, 564.2, 173, 155 R

[56] References Cited

U.S. PATENT DOCUMENTS 4,424,616 1/1984 Namano .............................. 29/563
4,634,037 1/1987 Yajima .............................. 228/6.1

FOREIGN PATENT DOCUMENTS 57-149038 9/1982 Japan .............................. 228/173.4
59-125233 7/1984 Japan .............................. 228/47

Primary Examiner—Nicholas P. Godici
Assistant Examiner—G. M. Reid
Attorney, Agent, or Firm—Cushman, Darby & Cushman

[57] ABSTRACT

An apparatus for forming a pipe frame for use in a vehicle seat is disclosed in which spring clamps are welded to a rectilinear pipe material of a predetermined length at the predetermined positions thereof, the pipe material is then bent into a required configuration, one of two ends of the pipe material is then compressed to form such a smaller diameter portion as to be insertable into the inside diameter portion of the other end, and the compressed smaller diameter portion of the one end is forcibly inserted into the other end so that the inserted portion of the pipe material is welded.

3 Claims, 4 Drawing Sheets

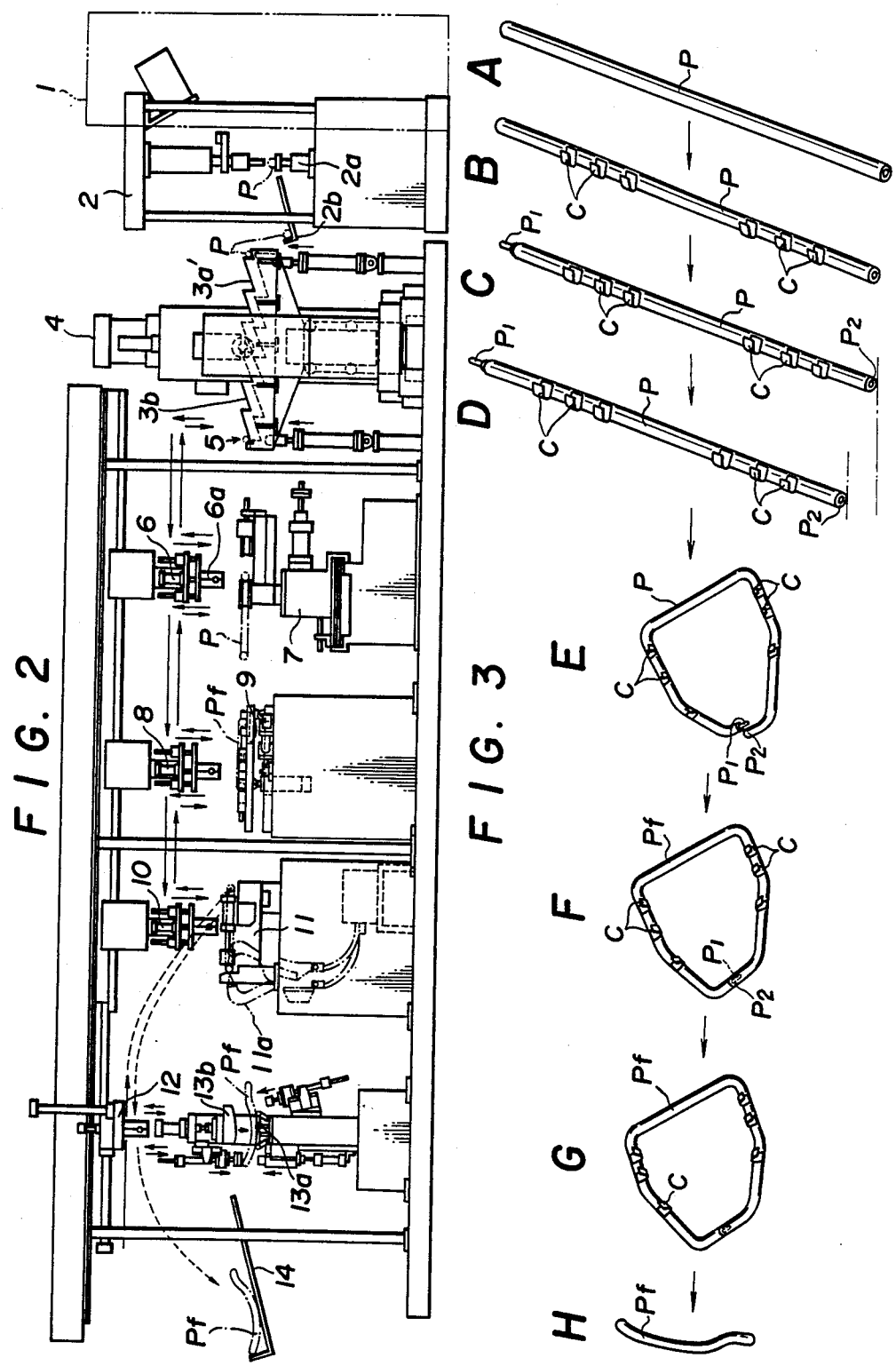

APPARATUS FOR FORMING A PIPE FRAME

This application is a continuation-in-part of Ser. No. 616,893, filed June 4, 1984, now abandoned.

BACKGROUND OF THE INVENTION

1. Field of the Invention

The present invention relates to an apparatus and method for forming a pipe seat frame for use in a seat for a vehicle such as an automobile, and, more particularly, to such apparatus and method for bending a rectilinear pipe material to form a pipe frame of a predetermined configuration.

2. Description of the Prior Art

As a seat frame for a vehicle seat a pipe frame formed of a pipe material is employed in view of reduction of the weight of such seat, and such pipe frame is provided in its side portions with spring clamps welded thereto so as to extend spring members for carrying a seat pad.

Conventionally, a pipe frame of this type is formed by bending a pipe material into an endless configuration and thereafter welding spring clamps to such endless pipe material in position. However, since such a pipe frame must have a bent form in its longitudinal direction or in its forward and rearward direction as well, when it is desired to automate such pipe frame forming process, it is found difficult to automate operations for supplying such pipe frames, setting the spring clamps in their predetermined positions of the associated pipe frame, and so on.

In a typical prior art process for forming a pipe frame, therefore, a general purpose bending apparatus is used to bend a pipe material and both ends of the bent pipe material are then butt welded together at their faces, or welded together via a core steel material to provide an endless configuration before spring clamps are welded to such endless pipe frame using a special welding apparatus.

In this prior art forming process, however, the number of man-hour in transporting such pipe materials between the work stations involved therein is quite large and thus a poor efficiency of operation results.

In addition, with such conventional forming technique, as mentioned above, the ends of such pipe materials are welded together in one of two ways. In one of them, the ends are butt welded to each other with their faces engaged together. In the other way, a core steel material is inserted into a pipe material in a manner to extend along both of the inside diameter portions of the pipe ends and thereater it is welded to such two ends respectively. Consequently, in the former case, spatters that are scattered around during welding may penetrate into the interior of the pipe material and remain contained therein. Because such spatters will produce noises while they are moved within the pipe frame, products containing such spatters therein are considered as defective and rejected, providing a poor yielding rate.

In the latter case, since both of the ends of the pipe material must be welded relative to the core steel material, the welding operation requires more time and labor. Also, such welding operation by means of the core steel material results in the increased weight of the pipe frame itself, which provides an unfavorable condition for a vehicle seat the entire weight of which is desired to lighten.

SUMMARY OF THE INVENTION

In view of the above-mentioned circumstances, the present invention is devised to eliminate the drawbacks in the above-mentioned prior art forming method and apparatus.

Accordingly, it is a main object of the invention to reduce the number of man-hour required for transfer of pipe materials between steps such as a step for welding spring clamps to a rectilinear pipe material, a step for compressing one end of such pipe material to a smaller diameter, a multi-bending forming step, a step for forcibly inserting the compressed end into the other end of the same pipe material and engaging these two ends with each other, a step for welding the inserted and engaged portions of the ends, and a solid bending forming step, so that an improved efficiency of operation can be obtained.

In order to attain this object, the present invention provides a new pipe frame forming apparatus. According to the new forming apparatus of the invention, a plurality of steps are carried out as a given cycle successively or intermittently in a fully-automatically operated or manually operated manner, which comprise a step for welding spring clamps to a rectilinear pipe material, a step for compressing one end of the rectilinear pipe material to a smaller diameter, a multi-bending forming step, a step for forcibly inserting the compressed end into the other end of the same pipe material and engaging these two ends with each other, a step for welding such engaged portions of the ends, and a solid bending forming step, with the two adjacent steps being connected with each other by means of a transfer mechanism respectively.

It is another object of the invention to prevent spatters from penetrating into a pipe material to remain contained therein as well as to eliminate the possibility of increasing the weight of a pipe frame itself as in the above-mentioned prior art welding technique using the core steel material.

To accomplish this object, according to the invention, one end of a rectilinear pipe material is compressed by swaging to have an outside diameter substantially equal to the inside diameter of the other end of the same pipe material, the compressed smaller diameter portion of the one end is then bent into a predetermined configuration so as to be superposed upon the other end, the superposed ends are opened in their axial directions so as to be opposed to each other, the compressed smaller diameter portion of the one end is forcibly inserted into the inside diameter portion of the other end for engagement therewith, and finally the engaged portions of the two ends are welded together while they are pressurized from outside to provide an endless frame.

Accordingly, according to the invention, in welding together both ends of the pipe material to form the pipe frame, an accurate alignment of the ends can be performed without using any intermediate member, the welding operation is simplified, and the spatters are prevented from penetrating into the pipe material during welding. In addition, since the welding operation is carried out without employing any core member, the weight of the pipe frame itself is not increased by any means.

These and other objects and many of the attendant advantages of this invention will be readily appreciated as the same becomes better understood by reference to

BRIEF DESCRIPTION OF THE DRAWINGS

FIG. 2 is a front view of the same;

FIG. 3 is a view to explain eight steps for forming a pipe frame in accordance with the invention;

DETAILED DESCRIPTION OF A PREFERRED EMBODIMENT OF THE PRESENT INVENTION

Figure 1:
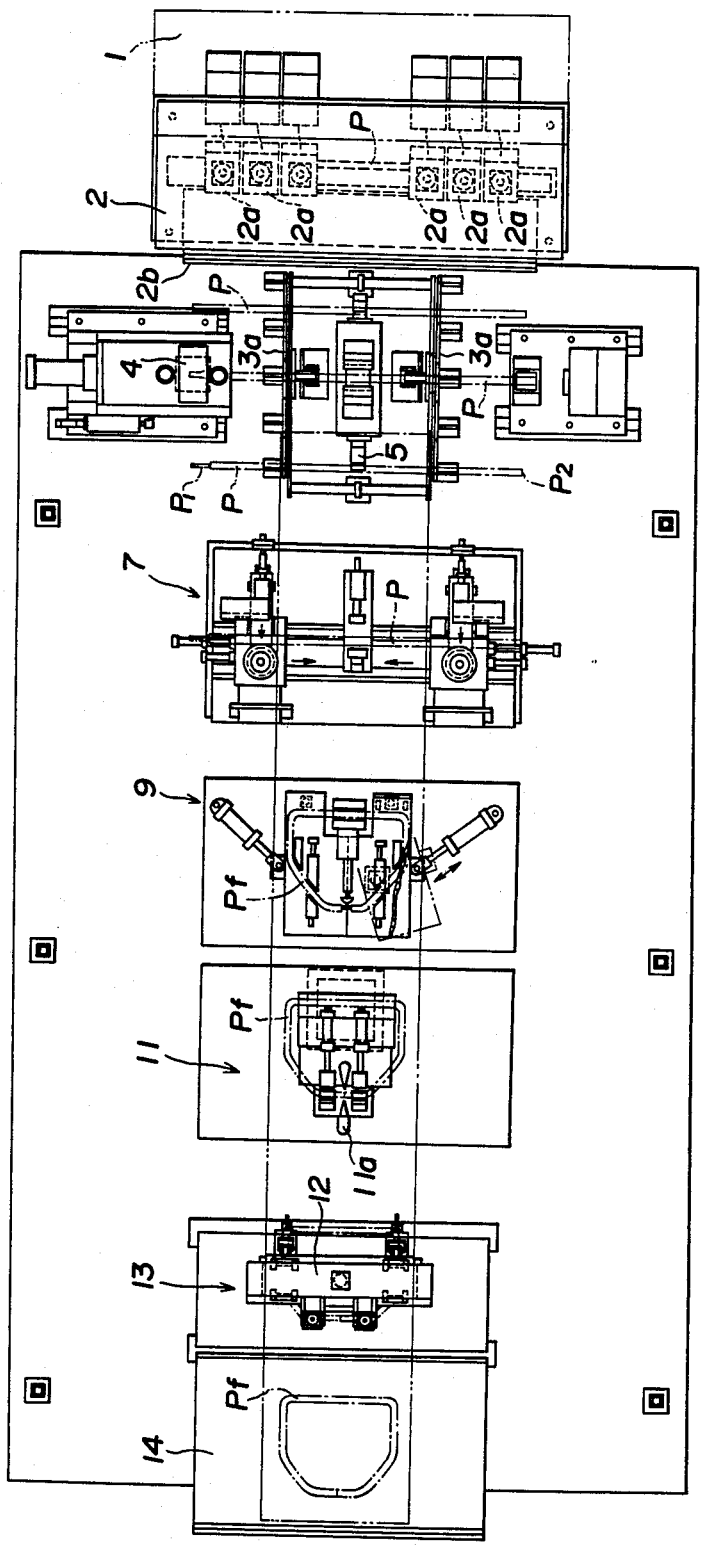
FIG. 1 is a plan view of a pipe frame forming apparatus constructed in accordance with the invention.

FIGS. 1 and 2 illustrate a pipe frame forming apparatus constructed in accordance with the invention. In the drawings, reference numeral (1) designates a supply hopper for storing a large number of pipe materials P respectively cut to a predetermined length, (2) represents a welding mechanism to weld a number of U-shaped spring clamps C to the pipe frame P of a rectilinear configuration, (3a) denotes a pipe material transfer mechanism which transfers the rectilinear pipe materials P provided with the spring clamps C welded thereto one by one, (4) stands for a swaging mechanism located in the intermediate portion of the pipe material transfer mechanism (3a) for collapsing or compressing one end of the pipe material P to have an outside diameter substantially equal to the inside diameter of the other end of the same pipe material, and (5) expresses a positioning mechanism provided at the forward end of the pipe material transfer mechanism (3a) for adjusting the spring clamps C in position. Numeral (7) designates a multi-bend forming mechanism which bends the pipe material P in such a manner that the compressed portion of the one end and the other end are superposed upon each other, (9) represents an insertion/engagement mechanism which once opens apart the superposed ends of the pipe material in an axial direction and then forcibly insert the compressed smaller diameter portion of the one end into the other end for engagement therewith, (11) denotes a welding mechanism to weld the inserted and engaged portions of the pipe material, (13) stands for a solid bend forming mechanism for bending the frame-shaped pipe material in its longitudinal direction. Numerals (6), (8), (10), and (12) designate respectively transfer mechanism which repsectively transfer the pipe materials between the adjacent mechanisms mentioned above.

FIG. 3 includes a plurality of views to illustrate sequentially steps for working a pipe material P by means of the above-mentioned mechanisms.

We will now describe the forming steps in detail in connection with FIGS. 1 and 2.

First, a great number of rectilinear pipe materials P (FIG. 3A) respectively of a desired length are stored in the supply hopper (1). One of the pipe materials P is taken from the supply hopper (1) and is set on a welding jig (2a) of a welding machine (2) for welding spring clamps C. After confirmation of the setting state of the pipe material P by means of an adjacently located switch (not shown) or the like, a required number (in the illustrated embodiment, 6 pcs.) of lined-up spring clamps C coming from a part feeder for spring clamps are set simultaneously and then welded to the pipe material P at the respectively predetermined positions thereof simultaneously (FIG. 3B). After such welding energization, that is to say, after the spring clamps are welded, the pipe material P is delivered onto a chute (2b) by a discharge kicker and is stocked there.

Figure 5A:
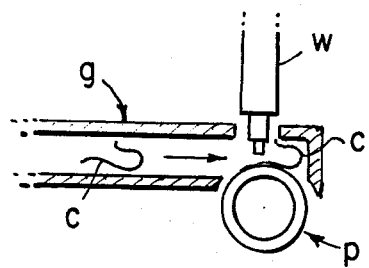
FIG. 5 is a view to explain three steps for positioning clamps on the pipe frame for welding and for bending the pipe frame without damaging the clamps.

As shown in FIG. 5A, each clamp is supplied through a guide member "g" and positioned on the upper surface of the pipe material P. Then, each clamp C is subjected to spot welding by a spot welding device W which is so constructed as to be moved vertically through an opening in the guide member "g" in order to weld each clamp C to the pipe material P.

Figure 5B:
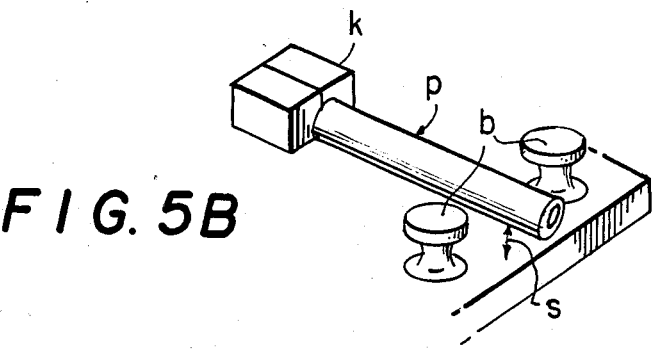

As shown in FIG. 5B, the pipe material P is then held by a chuck K such that a space S is provided between the pipe material P and a working platform. In this holding condition, the clamps C are thus positioned on a lower rear side of the pipe material P so that the clamps C are provided in such space S. Thereafter, a pair of bending rollers "b" are operated to bend the pipe material P in a transverse direction without the clamps C situated beneath the pipe material P being destroyed or damaged.

Figure 5C:
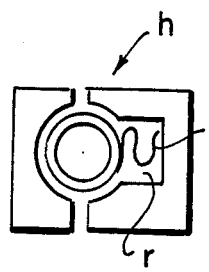

As shown in FIG. 5C, there is provided a recess "r" in a press holder "h" in which the clamps C are inserted. In this further holding condition, the clamps C are prevented from being damaged or broken during the solid bending step.

The pipe materials P that have been stocked in this way are taken out one by one by means of a take-out mechanism (not shown) and charged into a feed groove (3a') of a first pipe material transfer mechanism (3a) as shown in FIG. 2. This pipe material transfer mechanism (3a) comprises an angular fixed piece and the feed groove (3a') located inwardly of this fixed piece and movable in a vertical direction. The pipe material P that is charged into the feed groove (3a') is then transferred to the swaging mechanism (4), where one end $P_1$ of the pipe material P is compressed by swaging so as to have an outside diameter substantially equal to the inside diameter of the other end of the same pipe material P (FIG. 3C).

The pipe material P that has been swaged in this manner is then transferred to the positioning mechanism (5) by a second pipe material transfer mechanism (3b), where the pipe material P is rotationally moved fore and aft so that the swaged portion or the compressed smaller diameter portion $P_1$ of the one end of the pipe material P and the spring clamps C are properly positioned (FIG. 3D). During this operation, while the pipe material P is present, the following pipe materials are repeatedly supplied to both of the pipe material transfer mechanism (3a) and the swaging mechanism (4).

Then, the pipe material P that has been positioned in the positioning mechanism (5) is transferred, while it is maintained in its positioned condition, to and set in the multi-bend forming mechanism (7) by means of a finger chuck transfer mechanism (6). In this case, the pipe material P is retained by the finger chuck transfer mechanism (6) in the multi-bend forming mechanism (7) until the pipe material P is clamped so that the pipe material P will not be out of position. After confirmation of the clamping of the pipe material P, the finger chuck (6a) is opened to detach the finger chuck transfer mechanism (6) from the multi-bend forming mechanism (7). The pipe material P clamped in the multi-bend mechanism (7) is bent in its right and left portions simultaneously by a bend-header of a right and left symmetrical configuration. In other words, in accordance with predetermined core pipe strokes, distances, bend-angles of the pipe material and the like, various bending operations are carried out simultaneously at different work stations, which are sequentially arranged from the side of the two ends of the pipe material P towards the inside thereof. By the term "core pipe strokes", the inventor means the bending conditions such as a bending stroke in which to bend a pipe, namely a total process in which a pair of bending rollers are moved sequentially at predetermined points in order for the rollers to bend the pipe material at desired multiple angles and to provide a resulting pipe with multiple bends therein. By the term "distances", the inventor means the distance B required for the pair of bending rollers to move and stop, or, in other words, the distances between bending point B at which the bending rollers are paused to bend the pipe material. In this instance, the one end or the compressed smaller diameter portion $P_1$ is so bent as to be superposed upon the other end $P_2$, so that a given frame configuration is provided (FIG. 3E).

After completion of the bending operations in the multi-bend forming mechanism (7), the frame-shaped pipe material Pf is finger chucked at its two right and left rectilinear portions by a second finger chuck transfer mechanism (8), and is transferred to and set in the insertion/engagement mechanism (9). In this mechanism, the set frame-shaped pipe material Pf is clamped by two inside and outside metal mold, while the superposed two ends $P_1$, $P_2$ are opened in their axial direction to be opposed to each other. In this state, the one end compressed smaller diameter portion $P_1$ is forcibly inserted into the inside diameter portion of the other end $P_2$ (FIG. 3F). Thereafter, the inserted portion is driven by a punch for prevention of removal thereof.

After confirmation of completion of the insertion/engagement of the frame-shaped pipe material Pf, the pipe material Pf is transferred to the welding mechanism (11) by a third finger chuck transfer mechanism (10). The thus transferred frame-shaped pipe material Pf is clamped at its rectilinear portions from inside and outside, as in the insertion step in the last-mentioned insertion/engagement mechanism (9), to maintain its frame configuration in a given state, while the insertion/engagement portion of both ends $P_1$, $P_2$ is welded by pressurizing and electrically energizing it using an electrode gun (11a) (FIG. 3G).

The frame-shaped pipe material Pf that has been welded in the welding mechanism (11) is transferred and supplied to the solid bend mechanism (13) by means of a fourth finger chuck transfer mechanism (12). The frame-shaped pipe material Pf supplied to the solid bend forming mechanism (13), while maintained in its finger-chucked position, is bent from both sides thereof at a predetermined angle in a longitudinal direction (in a forward and rearward direction) by a fixed mold (13a) and a push mold (13b) (FIG. 3H).

In this case, since such bending operation causes the frame-shaped pipe material Pf to vary the position of the upper peripheral portions thereof, the finger-chucking action by means of the fourth finger chuck transfer mechanism (12) is released at the time when the frame-shaped pipe material Pf is fixed to the solid bend forming mechanism (13). After the longitudinal bending operation in the central portion of the pipe material Pf has been completed, while the frame-shaped pipe frame Pf remains pressurized upper and lower bend forming sections are actuated to perform their bending operations on the upper and lower portions of the frame-shaped pipe material Pf simultaneously.

Figure 4:
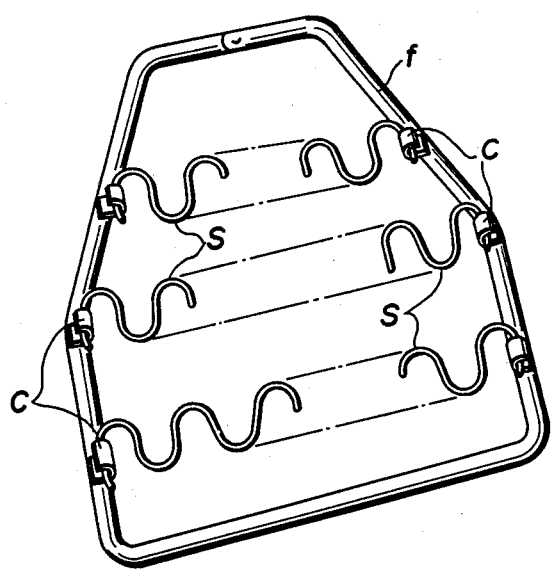
FIG. 4 is a perspective view of an example of the pipe frame for a vehicle seat formed in accordance with the present invention.

After completion of the upper and lower bending operations in this manner, when the upper bending section ceases to apply pressure to the frame-shaped pipe material and returns to its original position, the fourth finger chuck transfer mechanism (12) is shifted by the distance the pipe material Pf has been moved out of alignment, and then is operated to finger chuck the pipe material Pf and transfer it onto a delivery chute (14). This completes one cycle of forming a pipe frame to provide a finished pipe frame f provided with spring clamps C welded thereto as shown in FIG. 4. In FIG. 4, reference character S designates an S-spring extended between the spring clamps C.

The foregoing steps are performed continuously or intermittently in a fully-automatically or manually operated manner to form a pipe frame.

Also, in the last of the foregoing steps the solid bend forming mechanism (13) may be replaced by a horizontally-structured one, that is, it is possible to employ a mechanism comprising upper and lower metal molds which are opposed to each other.

As described before, according to the invention, as operations for welding spring clamps to a pipe material, swaging one end of the pipe material and bending the pipe material can be carried out while the pipe material is in a rectilinear condition to form a pipe frame, it is possible to automate the operation for forming a pipe frame and thus the efficiency of producing pipe frames provided with spring clamps can be improved remarkably. Also, since there is no possibility of spatters or the like penetrating into the interior of the pipe material during welding, a yield rate of products can be promoted and costs of the products can be reduced.

What is claimed is:

1. An apparatus for forming a pipe frame comprising:
   means for transferring a plurality of rectilinear pipe materials each of a required length one by one,
   first means, arranged adjacent to the transfering means, for welding a plurality of spring clamps to said pipe materials,
   a swaging means, arranged next to the first welding means, for compressing one end of each of said pipe materials so as to have an outside diameter substantially equal to the inside diameter of the other end thereof,
   a multi-bend forming means, positioned next to the swaging means, for bending said pipe materials in such a manner that said compressed smaller diameter portion of said one end is superimposed upon said other end,
   an insertion/engagement means, positioned adjacent to the multi-bend forming means, for opening apart said superimposed ends of said pipe materials in their respective axial direction and thereafter forcibly inserting said compressed smaller diameter portion of said one end into said other end,
   second means, positioned adjacent to the insertion/engagement mechanism, for welding said inserted/engaged portion of said pipe materials, and
   a solid bend forming means, positioned adjacent to the second welding means, for bending said frame-shaped pipe materials in a longitudinal direction,
   all of said means being connected with each other by said transferring means which transfer said pipe materials therebetween.

2. The apparatus as claimed in claim 1, wherein said multi-bend forming means is adapted to bend said pipe materials such that said welded spring clamps are oriented in the same direction.

3. The apparatus as claimed in claim 1, wherein said insertion/engagement means is arranged such that, after insertion of said compressed smaller diameter portion into said other end, said inserted portion is driven from outside by a punch to be dented so as to prevent removal of said compressed smaller diameter portion of said one end from its inserted position.

* * * * *